(12) United States Patent
Kim et al.

(10) Patent No.: US 11,209,520 B2
(45) Date of Patent: Dec. 28, 2021

(54) RADAR, SIGNAL PROCESSING CIRCUIT, AND SIGNAL PROCESSING METHOD

(71) Applicant: Electronics and Telecommunications Research Institute, Daejeon (KR)

(72) Inventors: Kisu Kim, Sejong-si (KR); Bon Tae Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 90 days.

(21) Appl. No.: 16/881,763

(22) Filed: May 22, 2020

(65) Prior Publication Data

US 2020/0371200 A1 Nov. 26, 2020

(30) Foreign Application Priority Data

May 24, 2019 (KR) .......................... 10-2019-0061490
May 15, 2020 (KR) .......................... 10-2020-0058132

(51) Int. Cl.
*G01S 7/292* (2006.01)

(52) U.S. Cl.
CPC .......... *G01S 7/2927* (2013.01); *G01S 7/2925* (2013.01)

(58) Field of Classification Search
CPC .... G01S 7/2925; G01S 7/2927; G01S 13/343; G01S 7/038; G01S 7/34; G01S 7/354
See application file for complete search history.

(56) References Cited

U.S. PATENT DOCUMENTS 6,445,726 B1 * 9/2002 Gharpurey ............... H03D 1/00
375/136
6,985,711 B2 * 1/2006 Holenstein ............ H04L 25/061
455/266

(Continued)

FOREIGN PATENT DOCUMENTS

KR  10-2006-0037777  5/2006
KR  10-2015-0060255  6/2015

OTHER PUBLICATIONS

Raghavendra Kulkarni et al., "UHF Receiver Front-End: Implementation and Analog Baseband Design Considerations", IEEE Transactions on Very Large Scale Integration (VLSI) Systems, vol. 20, No. 2, pp. 197-210, Feb. 2012.

*Primary Examiner* — Timothy X Pham
(74) *Attorney, Agent, or Firm* — Kile Park Reed & Houtteman PLLC (57) ABSTRACT

A radar includes a transmitter that generates a first signal that is a frequency modulated continuous wave (FMCW) signal and radiates the generated first signal to an outside, a receiver that receives a second signal based on the first signal and generates a baseband signal of the second signal, a signal processor that extracts a target frequency signal from the baseband signal, and a signal converter that outputs the target frequency signal that is controlled as a digital signal, and wherein the signal processor includes a high pass filter connected to the receiver, that receives the baseband signal, and attenuates a low frequency signal present in the received baseband signal, based on a first cutoff frequency, an amplifier that amplifies the attenuated baseband signal, and a signal controller that removes a direct current component of the amplified baseband signal, based on a second cutoff frequency.

19 Claims, 9 Drawing Sheets

(56) References Cited

U.S. PATENT DOCUMENTS

| | | | |
|---|---|---|---|
| 9,491,013 B2* | 11/2016 | Kwon | H04B 1/30 |
| 2005/0009489 A1* | 1/2005 | Sekiguchi | H03G 3/3068 |
| | | | 455/232.1 |
| 2006/0273952 A1 | 12/2006 | Krikorian et al. | |
| 2008/0089443 A1* | 4/2008 | Sanada | H04L 27/2657 |
| | | | 375/319 |
| 2016/0077134 A1* | 3/2016 | Rezk | G01S 7/021 |
| | | | 324/76.39 |
| 2017/0149463 A1 | 5/2017 | Kang et al. | |
| 2018/0143296 A1 | 5/2018 | Lee et al. | |
| 2019/0219672 A1 | 7/2019 | Yu | |

* cited by examiner

RADAR, SIGNAL PROCESSING CIRCUIT, AND SIGNAL PROCESSING METHOD

CROSS-REFERENCE TO RELATED APPLICATIONS

This U.S. non-provisional patent application claims priority under 35 U.S.C. § 119 of Korean Patent Application No. 10-2019-0061490, filed on May 24, 2019, and Korean Patent Application No. 10-2020-0058132, filed on May 15, 2020, the entire contents of which are hereby incorporated by reference.

Embodiments of the inventive concept relate to a radar, a signal processing circuit, and a signal processing method Embodiments of the inventive concept, more particularly, in a radar using a frequency modulated continuous wave (FMCW), relate to a radar, a signal processing circuit, and a signal processing method, which filter out leaking signals and compensate for attenuated signals when a target is far away.

In a FMCW-type radar that simultaneously transmits and receives signals, a distance between a transmitting antenna and a receiving antenna is close. Due to this structural feature, a signal leaks from the transmitting antenna to the receiving antenna. In this case, a low noise amplifier of a receiving device is saturated and a desired target signal cannot be received, or when the signal passes through a frequency mixer, the signal is converted into a low frequency signal, which has a very large signal strength.

In addition, due to a nature of the radar, a received signal is attenuated as a distance from the target increases. When a near target and a far target need to be detected at the same time, the required input dynamic range of an analog-to-digital converter becomes large, and the signal, which is outside the input dynamic range, may not be converted to digital values.

SUMMARY

Embodiments according to the inventive concept provide radar, signal processing circuitry, and signal processing method, which remove a low frequency component from a signal received by a radar and compensate for an attenuated receiving signal.

According to an embodiment of the inventive concept, a radar includes a transmitter that generates a first signal that is a frequency modulated continuous wave (FMCW) signal and radiates the generated first signal to an outside, a receiver that receives a second signal based on the first signal and generates a baseband signal of the second signal, a signal processor that extracts a target frequency signal from the baseband signal, and a signal converter that outputs the target frequency signal that is controlled as a digital signal, and wherein the signal processor includes a high pass filter connected to the receiver, that receives the baseband signal, and attenuates a low frequency signal present in the received baseband signal, based on a first cutoff frequency, an amplifier that amplifies the attenuated baseband signal, and a signal controller that removes a direct current component of the amplified baseband signal, based on a second cutoff frequency.

According to an embodiment, the signal processor, when the high pass filter is a first order filter, may set the first cutoff frequency to be the same as the second cutoff frequency, and may determine the first cutoff frequency and the second cutoff frequency as a maximum frequency of the baseband signal being input.

According to an embodiment, the amplifier may include a fully differential operational amplifier, a variable resistor, and a capacitor, and a frequency gain of the amplifier may be controlled by adjusting the variable resistor.

According to an embodiment, the signal processor, when the high pass filter is a second order filter, may determine the first cutoff frequency as a maximum frequency of the baseband signal being input, and may determine the second cutoff frequency as a minimum frequency of the baseband signal being input.

According to an embodiment, the amplifier may include an operational amplifier and a variable resistor, and a frequency gain of the amplifier may be controlled by adjusting the variable resistor.

According to an embodiment, the high pass filter may cancel a reflected wave or a leakage signal and may control a frequency to have a uniform rate of a gain change.

According to an embodiment, the signal processor may determine the second cutoff frequency, based on a maximum reachable distance of the frequency modulated continuous wave signal.

According to an embodiment of the inventive concept, a signal processing circuit that extracts a target frequency signal includes a high pass filter that receives a baseband signal of a second signal based on a first signal, and attenuates a low frequency signal present in the received baseband signal, based on a first cutoff frequency, an amplifier that amplifies the attenuated baseband signal, and a signal controller that removes a direct current component of the amplified baseband signal, based on a second cutoff frequency.

According to an embodiment, when the high pass filter is a first order filter, the first cutoff frequency may be set to be the same as the second cutoff frequency, and the first cutoff frequency and the second cutoff frequency may be a maximum frequency of the baseband signal being input.

According to an embodiment, the amplifier may include a fully differential operational amplifier, a variable resistor, and a capacitor, and a frequency gain of the amplifier may be controlled by adjusting the variable resistor.

According to an embodiment, when the high pass filter is a second order filter, the first cutoff frequency may be determined as a maximum frequency of the baseband signal being input, and the second cutoff frequency may be determined as a minimum frequency of the baseband signal being input.

According to an embodiment, the amplifier may include an operational amplifier and a variable resistor, and a frequency gain of the amplifier may be controlled by adjusting the variable resistor.

According to an embodiment, the high pass filter may cancel a reflected wave or a leakage signal and may control a frequency to have a uniform rate of a gain change.

According to an embodiment, the second cutoff frequency may be determined based on a maximum reachable distance of a frequency modulated continuous wave signal.

According to an embodiment of the inventive concept, a signal processing method includes generating a first signal that is a frequency modulated continuous wave (FMCW) signal, and radiating the generated first signal to an outside, receiving a second signal based on the first signal, and generating a baseband signal of the second signal, extracting a target frequency signal from the baseband signal, and outputting the target frequency signal that is controlled as a digital signal, and wherein the extracting of the target frequency signal includes receiving the baseband signal, attenuating a low frequency signal present in the received baseband signal, based on a first cutoff frequency, amplifying the attenuated baseband signal, and removing a direct current component of the amplified baseband signal, based on a second cutoff frequency.

According to an embodiment, the signal processing method, when the target frequency signal is extracted in a differential mode (with second order high pass filter), may further include setting the first cutoff frequency to be the same as the second cutoff frequency, and determining the first cutoff frequency and the second cutoff frequency as a maximum frequency of the baseband signal being input.

According to an embodiment, the signal processing method, when the target frequency signal is extracted in a single ended mode (with first order high pass filter), may further include determining the first cutoff frequency as a maximum frequency of the baseband signal being input, and determining the second cutoff frequency as a minimum frequency of the baseband signal being input.

According to an embodiment, the attenuating of the low frequency signal present in the received baseband signal, based on the first cutoff frequency may include cancelling a reflected wave or a leakage signal, and controlling a frequency to have a uniform rate of a gain change.

According to an embodiment, the signal processing method may further include determining the second cutoff frequency, based on a maximum reachable distance of the frequency modulated continuous wave signal.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Throughout the specification, the same reference numerals refer to the same components. This specification does not describe all elements of the embodiments, and overlaps between general contents or embodiments in the technical field to which the present invention pertains are omitted. The term "unit, module, member, or block" used in the specification may be implemented by software or hardware, and according to embodiments, it is also possible that a plurality of "unit, module, member, or block" may be implemented as one component, or that one "part, module, member, or block" includes a plurality of components.

Throughout the specification, when a part is "connected" to another part, this includes a case of being directly connected as well as being connected indirectly, and indirect connection includes connecting through a wireless communication network.

Also, when a part is said to "comprise" a certain component, this means that other components may be further included instead of excluding other components unless specifically stated otherwise.

Throughout the specification, when one member is positioned "on" another member, this includes not only the case where one member abuts another member, but also another member between the two members.

Terms such as first and second are used to distinguish one component from other components, and the component is not limited by the above-described terms.

A singular expression includes a plural expression unless the context clearly has an exception.

In each of steps, an identification code is used for convenience of description, and the identification code does not describe the order of each of the steps, and each of the steps may be performed differently from the specified order, unless a specific order is explicitly stated in the context.

Hereinafter, the principle and embodiments of the inventive concept will be described with reference to accompanying drawings.

Figure 1:
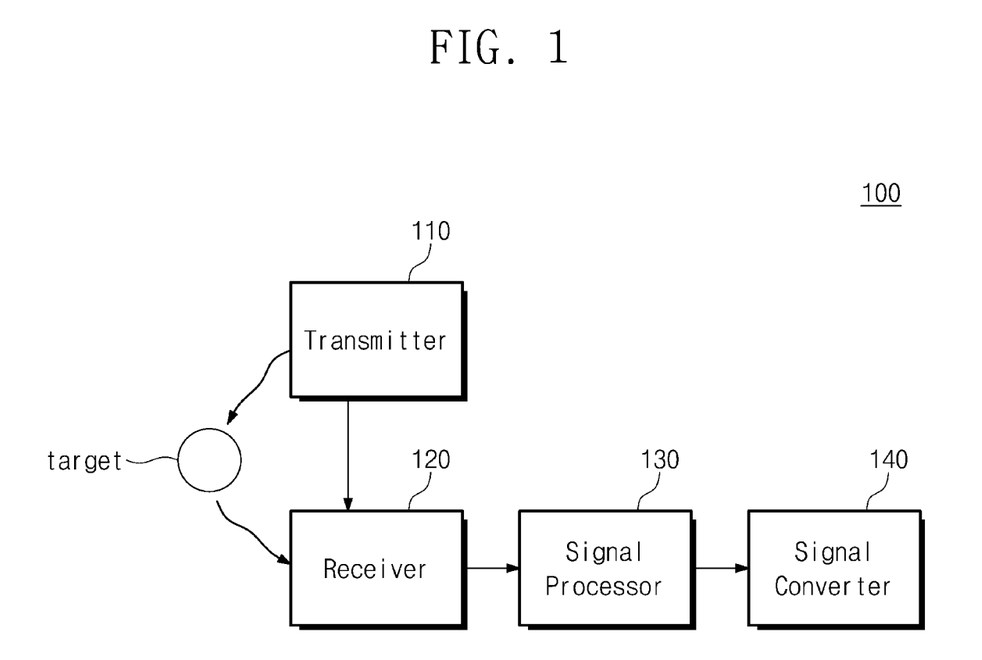
FIG. 1 is a block diagram illustrating a radar according to an embodiment of the inventive concept.

FIG. 1 is a block diagram illustrating a radar 100 according to an embodiment of the inventive concept.

Referring to FIG. 1, the radar 100 according to an embodiment may include a transmitter 110, a receiver 120, a signal processor 130, and a signal converter 140.

The transmitter 110 generates a frequency signal and radiates the generated signal to an outside. In this case, the generated frequency signal may be a frequency modulated continuous wave (FMCW) signal, but is not limited thereto.

The receiver 120 receives a reflected wave of the frequency signal that is reflected from a target existing in the outside. Also, the receiver 120 may receive a leakage signal that is leaked without reaching the target among signals radiated from the transmitter 110. The receiver 120 down-converts the reflected wave of the frequency signal or the leakage signal into a baseband signal, and inputs the converted baseband signal to the signal processor 130. Here, the target may be an object such as a moving drone, but is not limited thereto.

The signal processor 130 extracts a target frequency from the baseband signal. Specifically, the signal processor 130 receives the baseband signal from the receiver 120, removes a low frequency signal and a direct current component from a frequency of the baseband signal, and extracts the target frequency. Specifically, the signal processor 130 receives the baseband signal and attenuates the input baseband signal, based on a first cutoff frequency. Here, the first cutoff frequency may vary depending on an input signal band. The first cutoff frequency will be described in detail with reference to FIGS. 3 to 5. The signal processor 130 may amplify the baseband signal attenuated by the first cutoff frequency. The signal processor 130 removes the DC component (DC offset) present in the amplified baseband signal. Here, the removal of the DC component may be performed based on a preset second cutoff frequency.

In addition, the signal processor 130 includes a high pass filter 131, an amplifier 132, and a signal controller 133. Structurally, the high pass filter 131 is connected to the receiver 120. Since the receiver 120 and the high pass filter 131 are connected, the signal processor 130 is serially connected to the receiver 120. Each component and function of the signal processor 130 will be described in detail in FIG. 2.

The signal converter 140 converts and outputs the target frequency signal into a digital signal. Here, the digital signal is a signal that is output by compensating for signal attenuation based on a reflected wave signal depending on a distance of the target. A configuration included in the signal converter 140 will be described in detail in FIG. 2.

Figure 2:
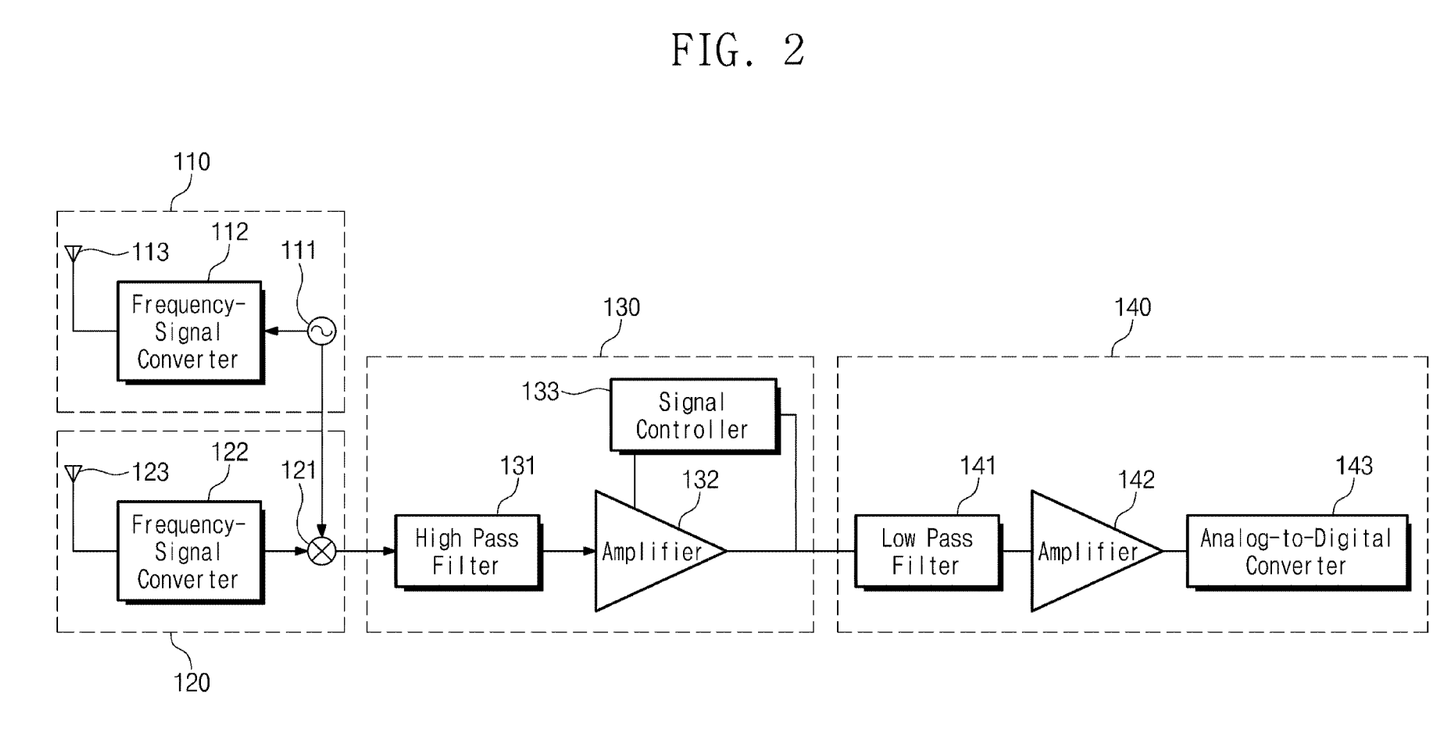
FIG. 2 is a diagram illustrating a detailed configuration of a radar according to an embodiment.

FIG. 2 is a diagram illustrating a detailed configuration of the radar 100 according to an embodiment.

Referring to FIG. 2, the transmitter 110 according to an embodiment includes a frequency generator 111, a frequency-signal converter 112, and an antenna 113.

The frequency generator 111 generates a first signal that is the frequency modulated continuous wave signal. In addition, the frequency generator 111 transmits the generated first signal to the frequency-signal converter 112 and a frequency mixer 121 that is provided in the receiver 120. In this case, the frequency information generated may vary depending on the distance or a speed of a detected object. When a frequency is generated, the frequency-signal converter 112 amplifies the first signal. When the first signal is amplified, the antenna 113 radiates the generated frequency modulated continuous wave to the outside.

The receiver 120 according to an embodiment includes the frequency mixer 121, a frequency-signal converter 122 and an antenna 123.

The antenna 123 receives a second signal based on the first signal. Here, the second signal may include the first signal reflected from the target and the first signal leaked from the transmitter 110. The antenna 123 transmits the received second signal to the frequency-signal converter 122. The frequency-signal converter 122 transmits the second signal received by the antenna 123 to the frequency mixer 121. When the second signal is input to the frequency mixer 121, the frequency mixer 121 generates the baseband signal, based on the input second signal. The frequency mixer 121 transmits the generated baseband signal to the signal processor 130.

The signal processor 130 according to an embodiment includes the high pass filter 131, the amplifier 132, and the signal controller 133.

The signal processor 130 receives the baseband signal from the receiver 120, removes the low frequency component included in the baseband signal, amplifies the baseband signal, and removes the DC component included in the baseband signal. The signal processor 130 will be described in detail with reference to FIG. 3.

The signal converter 140 includes a low-pass filter 141, an amplifier 142 and an analog-to-digital signal converter 143.

The low pass filter 141 receives the baseband signal from which the low frequency component is removed and the DC component is removed from the signal processor 130 and passes only a signal necessary for detection of a target object.

The amplifier 142 amplifies the signal that passes through the low pass filter 141, and the analog-to-digital signal converter 143 converts the baseband signal, which is an analog signal, into a digital signal. The radar 100 may obtain target information, based on the converted digital signal. Here, the target information may include a position of the target, a moving direction of the target, a speed or acceleration of the target, but is not limited thereto.

Figure 3:
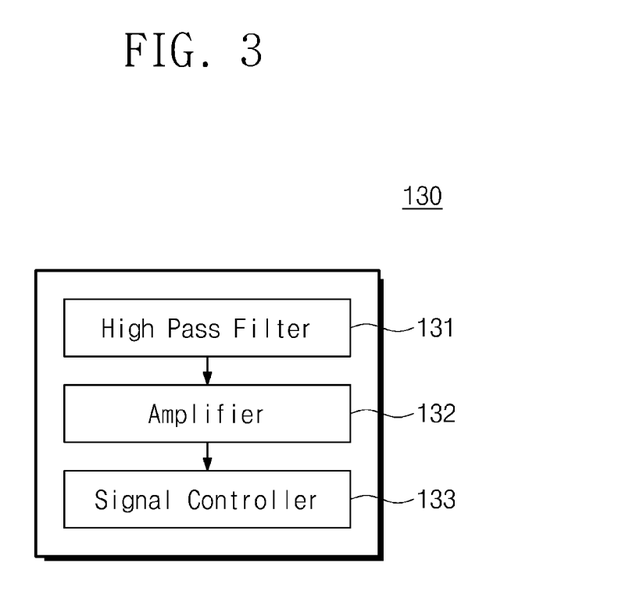
FIG. 3 is a diagram illustrating a signal processor according to an embodiment.

FIG. 3 is a diagram illustrating the signal processor 130 according to an embodiment.

The signal processor 130 according to an embodiment includes the high pass filter 131, the amplifier 132, and the signal controller 133.

The high pass filter 131 receives the baseband signal from the receiver 120, and attenuates the low frequency signal included in the input baseband signal, based on the first cutoff frequency. Here, the low frequency signal included in the baseband signal may be most likely the first signal leaked from the transmitter 110. Therefore, when the high pass filter 131 is directly connected to a rear end of the receiver 120, the low frequency signal included in the baseband signal may be preferentially attenuated. When the low frequency signal is attenuated, the leakage signal component of the transmitter 110 is removed from the baseband signal. The first cutoff frequency may vary depending on a band of the signal input to the high pass filter 131. In addition, since the input signal band may vary depending on the distance of the detected object, the first cutoff frequency may vary depending on the distance of the detected object.

The amplifier 132 amplifies a strength of the signal that passes through the high pass filter 131. The amplifier 132 includes a variable resistor. A resistance ratio of the amplifier 132 is controlled based on the control of the size of the variable resistor, and a gain of the amplifier 132 may be controlled as a result of controlling the resistance ratio. Here, the meaning of amplification may include both subtraction and addition, and the amplifier 132 may amplify the input signal as a negative value or a positive value.

The signal controller 133 removes the DC component present in the baseband signal, based on a second cutoff frequency. When the amplifier 132 amplifies the baseband signal, a DC component signal included in the baseband signal is also amplified. The signal controller 133 removes the amplified DC component signal. Here, the second cutoff frequency may be set based on a driving mode of the radar 100. When the radar 100 is driven in a single ended mode, the second cutoff frequency may be set to a minimum frequency of an input baseband signal frequency band. Hereinafter, the single ended mode means that HPF (High Pass Filter) is configured to a second order filter. When the radar 100 is driven in a differential mode, the second cutoff frequency may be set to be the same as the first cutoff frequency. When the DC component signal is removed, the signal processor 130 may extract only a signal necessary for the object detection. As a result, the signal controller 133 compensates for an attenuation effect of the baseband signal depending on the distance of the detected object, and there is an effect of attenuating the low frequency signal due to the leakage signal of the transmitter 110.

In addition, the signal controller 133 may vary a configuration according to the driving mode of the radar 100. Specifically, when the radar 100 is controlled in the single ended mode, the signal controller 133 includes an operational amplifier. When the radar 100 is controlled in the differential mode, the signal controller 133 includes a fully differential operational amplifier.

Here, a single ended mode means a case where the high pass filter 131 according to an embodiment is configured as a second order passive filter 131a, and the signal processor 130 is composed of one conductor serving as ground and one conductor through which the signal is transmitted. In addition, the differential mode means a case where the high pass filter 131 according to an embodiment is configured as a first order passive filter 131b, and two signals having the same frequency and amplitude are input in reverse phase.

In addition, the signal processor 130 may exist as a configuration of the radar 100, or may exist as a single radar control device.

Figure 4:
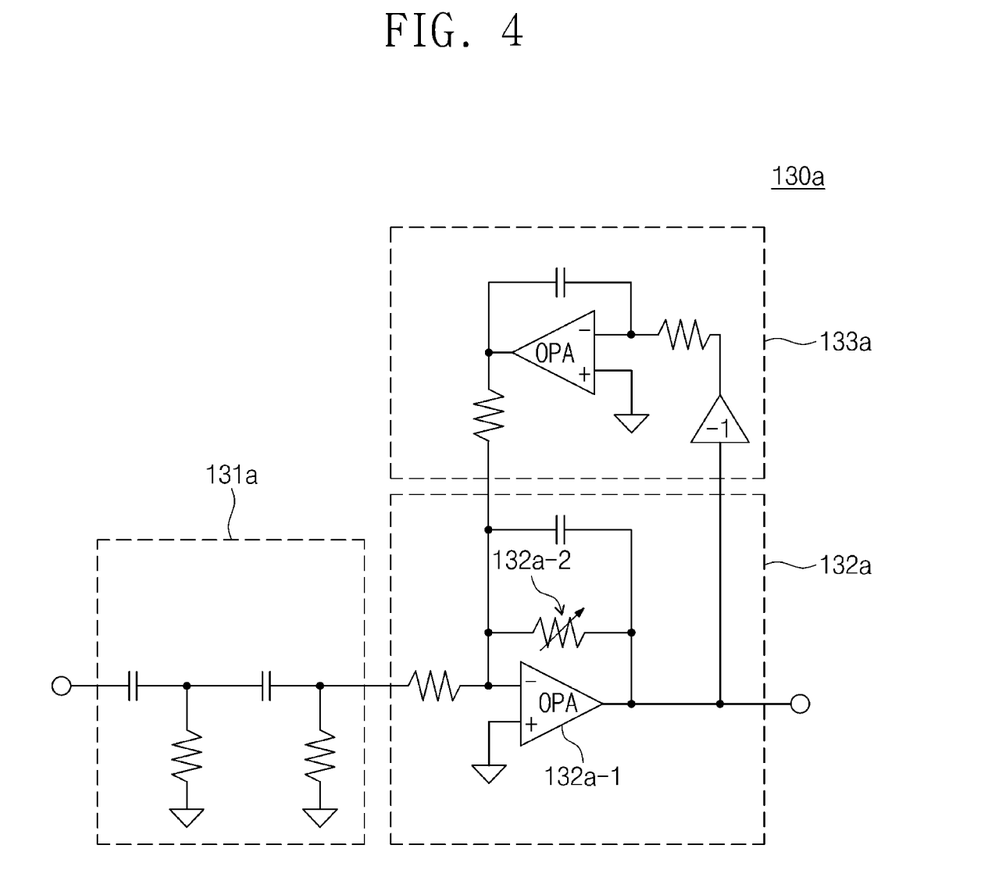
FIG. 4 is a circuit diagram illustrating a signal processor when a radar according to an embodiment operates in a single ended mode.

FIG. 4 is a circuit diagram illustrating the signal processor 130 when the radar 100 according to an embodiment operates in a single ended mode.

Referring to FIG. 4, when the radar 100 is driven in the single ended mode, a signal processor 130a includes the second order passive filter 131a, an amplifier 132a, and a signal controller 133a.

The high pass filter 131 according to an embodiment may be configured as the second order passive filter 131a in the single ended mode. The second order passive filter 131a may include two series-connected capacitors and two resistors. In the single ended mode, the second order passive filter 131a may set a maximum frequency of the input baseband signal as the first cutoff frequency.

The amplifier 132a according to an embodiment includes an operational amplifier 132a-1 and a variable resistor 132a-2 in the single ended mode. The variable resistor 132a-2 may control the resistance ratio and may control the gain of the amplifier 132a through a change in the resistance ratio.

The signal controller 133a according to an embodiment may set a minimum frequency of the baseband signal input to the second order passive filter 131a as the second cutoff frequency in the single ended mode, and may remove the DC component included in the baseband signal.

By including the above-described configurations, the signal processor 130a may compensate for the signal attenuation effect depending on the distance between the target and the radar 100 in the second order passive filter 131a. In addition, the signal processor 130a may compensate for the signal attenuation effect depending on the distance between the target and the radar 100 in the signal controller 133a, and may attenuate the low frequency signal by the leakage signal of the transmitter 110.

Figure 5:
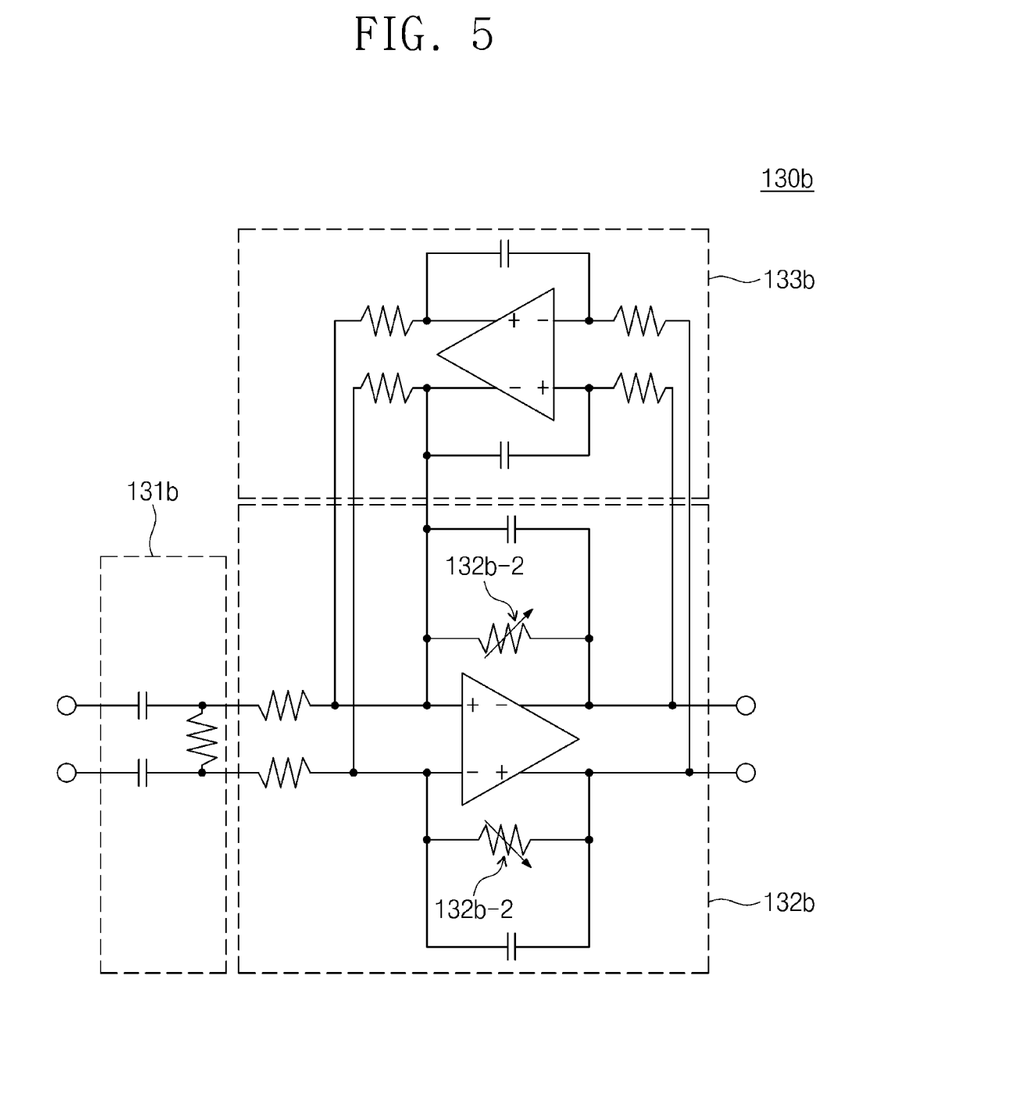
FIG. 5 is a circuit diagram illustrating a signal processor when a radar according to an embodiment operates in a differential mode.

FIG. 5 is a circuit diagram illustrating the signal processor 130 when the radar 100 according to an embodiment operates in a differential mode.

The high pass filter 131 according to an embodiment may be configured as the first order passive filter 131b in the differential mode. The first order passive filter 131b may include two parallel connected capacitors and one resistor. In the differential mode, the first order passive filter 131b may set the maximum frequency of the input baseband signal as the first cutoff frequency.

An amplifier 132b according to an embodiment includes an operational amplifier 132b-1 and a variable resistor 132b-2 in the differential mode. The variable resistor 132b-2 may control the resistance ratio and may control the gain of the amplifier 132b through a change in the resistance ratio.

A signal controller 133b according to an embodiment is composed of a fully differential amplifier, a resistor and a capacitor in the differential mode. The signal controller 133b may set the second cutoff frequency to the same value as the first cutoff frequency in the differential mode.

By including the above-described configurations, the signal processor 130a, b compensates for the signal attenuation effect depending on the distance between the target and the radar 100, and may attenuate the low frequency signal by the leakage signal of the transmitter 110 at the same time.

Figure 6:
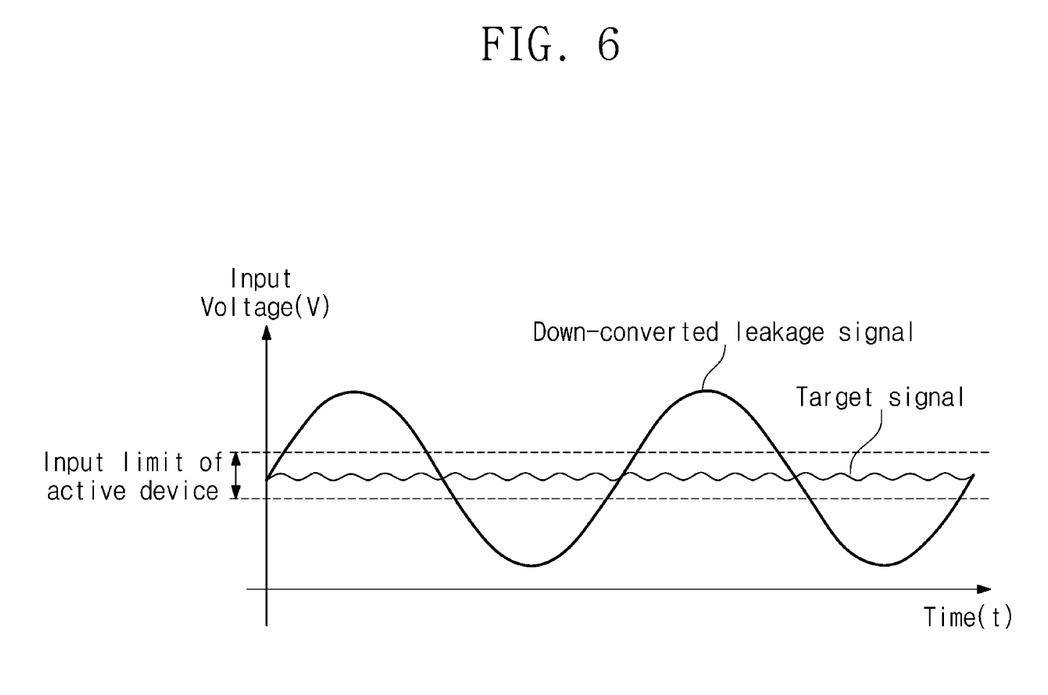
FIG. 6 is a diagram illustrating a signal input to a signal processor according to an embodiment.

FIG. 6 is a diagram illustrating a signal input to the signal processor 130 according to an embodiment.

Referring to FIG. 6, an x-axis of a disclosed graph denotes a time "t", and a y-axis denotes a voltage "V" of the input baseband signal. As illustrated in FIG. 6, a down-converted leakage signal of the transmitter 110 represents low frequency characteristics. Also, a signal (target signal) reflected from the target represents relatively high frequency characteristics.

When the radar 100 is controlled by using an active element as in the existing technology, a radar control device is out of an input possible range when the leakage signal of the transmitter 110 is included due to an input restriction of the active element, and thus the signal cannot be output normally. However, by directly connecting the high pass filter 131 composed of passive elements, such as the disclosed signal processor 130, to the receiver 120, the leakage signal having a low frequency characteristic may be attenuated.

In addition, since a frequency of the target signal that is input to the receiver and is down-converted in the FMCW radar is proportional to the distance, and the signal strength is inversely proportional to a fourth power of the distance, the signal processor 130 may set the first cutoff frequency, based on the maximum detection distance of the target.

Figure 7:
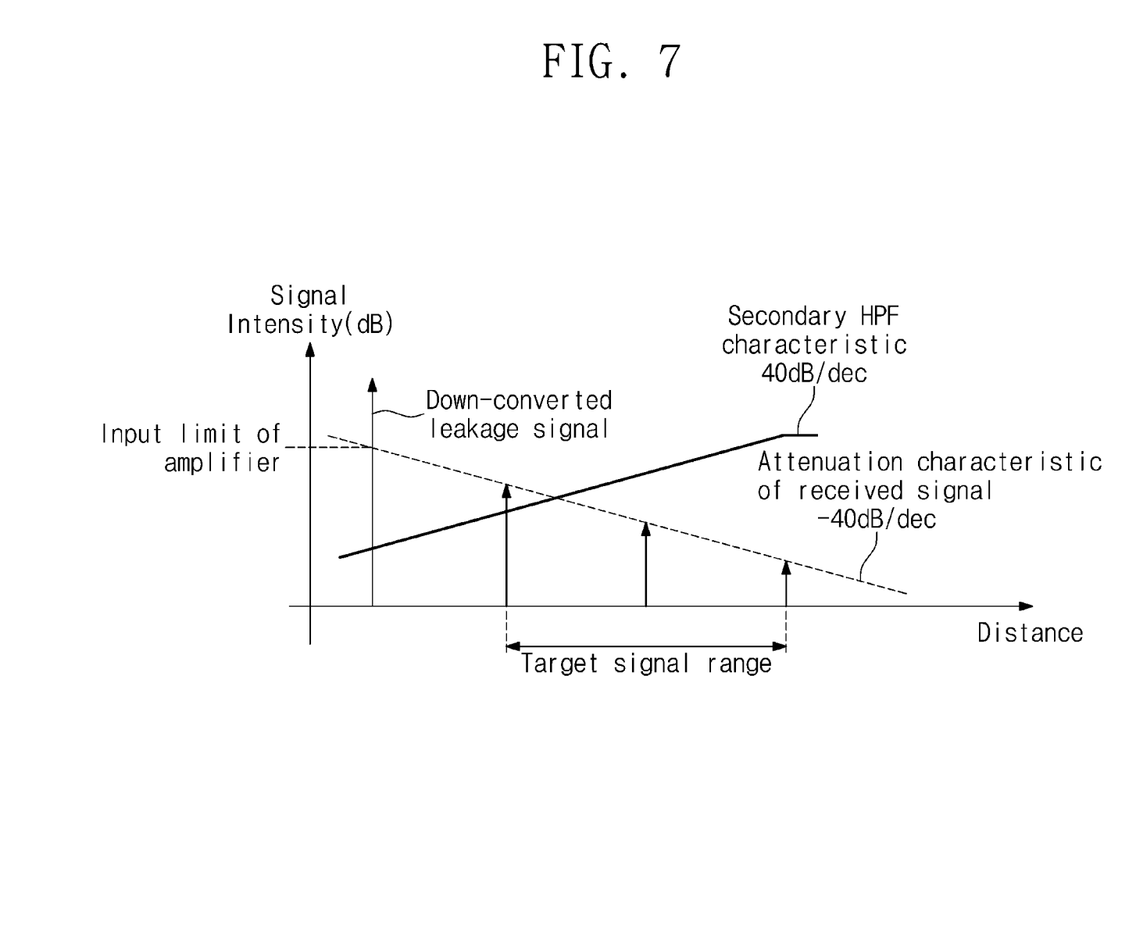
FIG. 7 is a diagram describing characteristics of a signal input to a signal processor according to an embodiment.
Figure 8:
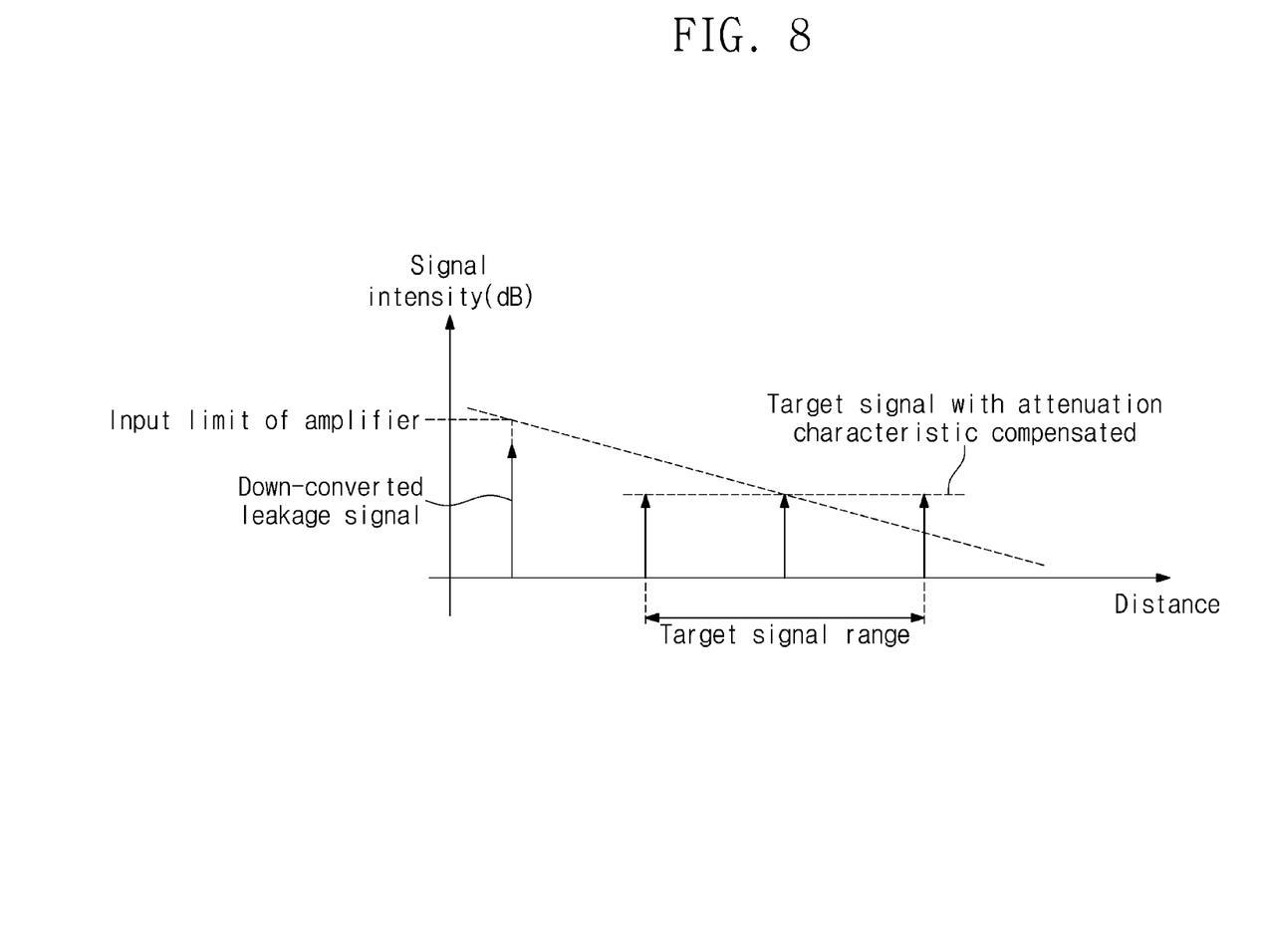
FIG. 8 is a diagram describing characteristics of a signal output from a signal processor according to an embodiment.

FIG. 7 is a diagram describing characteristics of a signal input to the signal processor 130 according to an embodiment, and FIG. 8 is a diagram describing characteristics of a signal output from the signal processor 130 according to an embodiment. X-axes of the graphs disclosed in FIGS. 7 and 8 represent the distance between the radar 100 and the target, and y-axes represent the strength of the signal received by the receiver 120.

Referring to FIGS. 7 and 8, as the distance between the target and the radar 100 increases, an intensity of a received reflected wave signal is attenuated. For example, when a signal characteristic of the radar 100 is −40 dB/dec, the signal may be compensated by the first order high pass filter 131b having characteristic of +20 dB/dec and the signal processor 130 having characteristic of +20 dB/dec. In addition, when the signal characteristic of the radar 100 is −40 dB/dec, the signal may be compensated by the second order high pass filter 131a having characteristic of +40 dB/dec. However, the signal intensity of the radar 100, the characteristics of the first order and second order high pass filters 131b and 131a are not limited thereto. In addition, the down-converted leakage signal may be a signal that has a value exceeding an input limit range of the amplifier 132.

Referring to FIG. 7, when the radar 100 according to an embodiment is driven in the single ended mode, the high pass filter 131 may set a signal that has the opposite sign and the same magnitude as the attenuation rate of the baseband signal converted by the receiver 120 as the first cutoff frequency, and may compensate for the attenuation of the baseband signal.

Referring to FIG. 8, by setting the first cutoff frequency of the high pass filter 131 to the maximum frequency of the input baseband signal, the low frequency signal due to the leakage signal is significantly attenuated, and the attenuation depending on the distance of the input reflected wave signal (target signal) is compensated. As a result, the signal processor 130 according to an embodiment may cancel the reflected wave signal or the leakage signal and may output a signal having a uniform gain change rate.

Figure 9:
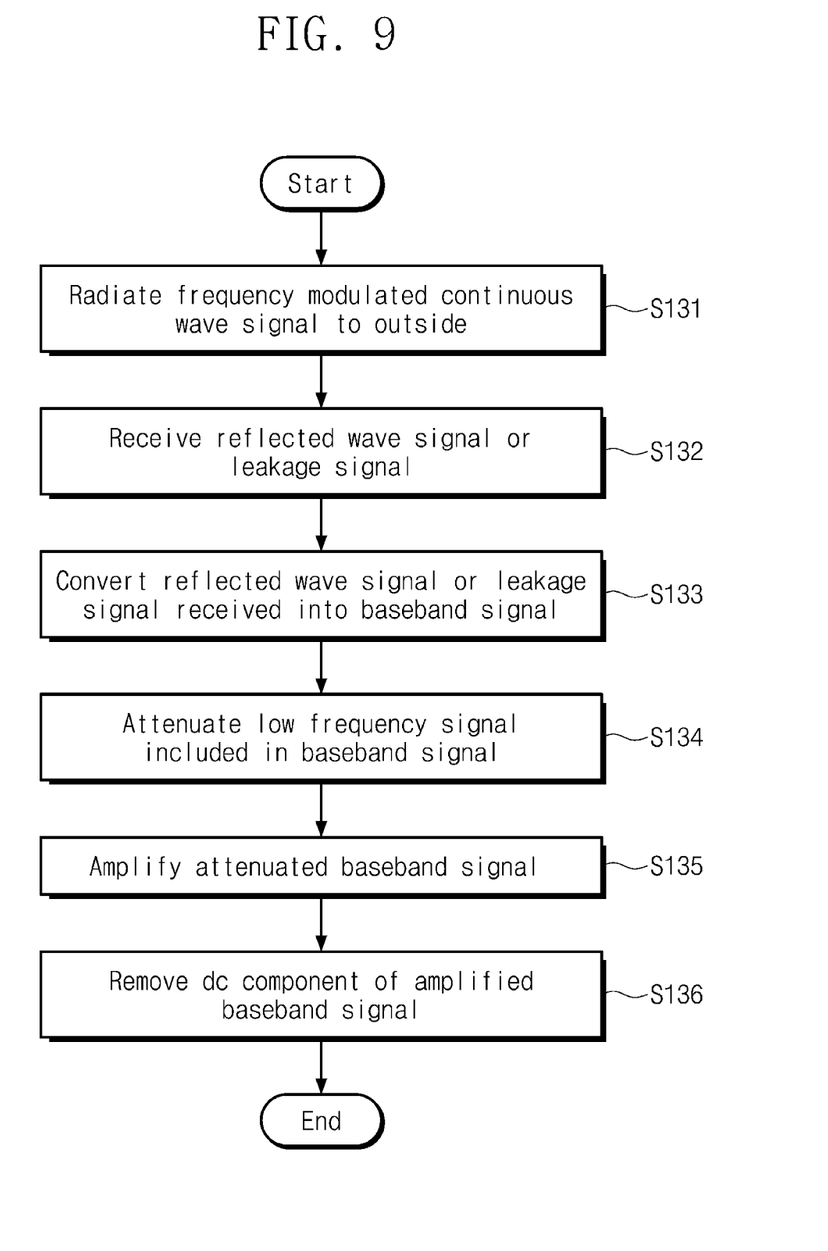
FIG. 9 is a flowchart describing a control process of a radar according to an embodiment.

FIG. 9 is a flowchart describing a control process of the radar 100 according to an embodiment.

Referring to FIG. 9, the transmitter 110 generates the frequency modulated continuous wave signal and radiates the generated frequency modulated continuous wave signal to the outside (S131).

When the frequency modulated continuous wave signal is radiated to the outside, the receiver 120 receives the reflected wave signal (target signal) of the frequency modulated continuous wave reflected from the target and the leakage signal leaked from the transmitter 110 (S132).

When the reflected wave signal or the leakage signal is received, the receiver 120 converts the received reflected wave signal and the leakage signal into the baseband signal (S133).

When the reflected wave signal and the leakage signal are converted into the baseband signal, the signal processor 130 attenuates the low frequency component included in the baseband signal (S134).

In this case, the signal processor 130 may attenuate a signal representing the low frequency characteristic by the first cutoff frequency. According to an embodiment, since the leakage signal has the low frequency characteristic, the signal processor 130 may remove the leakage signal component by performing operation of attenuating the signal having the low frequency characteristic.

When the low frequency signal included in the baseband signal is attenuated, the signal processor 130 amplifies the baseband signal (S135).

As described above, the signal processor 130 may amplify the baseband signal through controlling the resistance ratio of the amplifier 132. Here, the meaning of amplification includes the meaning of subtraction and addition, and the amplifier 132 may amplify the baseband signal as a positive value or a negative value.

When the baseband signal is amplified, the signal processor 130 removes the DC component included in the amplified baseband signal (S136).

When the baseband signal is amplified, the DC component included in the baseband signal is also amplified. The signal controller 133 provided in the signal processor 130 removes the DC component included in the baseband signal, based on the second cutoff frequency.

When the low frequency component is removed from the baseband signal and the DC component is removed, the signal processor 130 may output a final baseband signal for conversion to the digital signal.

According to the inventive concept, by including the above-described configurations, embodiments may provide a radar, a signal processing circuit, and a signal processing method capable of filtering a leakage signal and controlling the frequency gain of the attenuated reflected wave signal.

In addition, embodiments may provide a radar, a signal processing circuit, and a signal processing method that compensate for a signal attenuation effect by a distance between a target and a radar by using a high pass filter.

In addition, embodiments may provide a signal processing circuit capable of high integrity by a CMOS process because a capacitance may be configured with a significantly smaller area than a filter having a cutoff frequency lower than a desired signal band.

The contents described above are specific embodiments for implementing the inventive concept. The inventive concept may include not only the embodiments described above but also embodiments in which a design is simply or easily capable of being changed. In addition, the inventive concept may also include technologies easily changed to be implemented using embodiments.

What is claimed is:

1. A radar comprising:
 a transmitter configured to generate a first signal that is a frequency modulated continuous wave (FMCW) signal and to radiate the generated first signal to an outside;
 a receiver configured to receive a second signal based on the first signal and to generate a baseband signal of the second signal;
 a signal processor configured to extract a target frequency signal from the baseband signal, and
 a signal converter configured to output the target frequency signal that is controlled as a digital signal, and
 wherein the signal processor comprises:
 a high pass filter connected to the receiver, configured to receive the baseband signal, and to attenuate a low frequency signal present in the received baseband signal, based on a first cutoff frequency;
 an amplifier configured to amplify the attenuated baseband signal; and
 a signal controller configured to remove a direct current component of the amplified baseband signal, based on a second cutoff frequency.

2. The radar of claim 1, wherein the signal processor, when the high pass filter is a first order filter, sets the first cutoff frequency to be the same as the second cutoff frequency, and determines the first cutoff frequency and the second cutoff frequency as a maximum frequency of the baseband signal being input.

3. The radar of claim 2, wherein the amplifier includes a fully differential operational amplifier, a variable resistor, and a capacitor, and
 wherein a frequency gain of the amplifier is controlled by adjusting the variable resistor.

4. The radar of claim 1, wherein the signal processor, when the high pass filter is a second order filter, determines the first cutoff frequency as a maximum frequency of the baseband signal being input, and determines the second cutoff frequency as a minimum frequency of the baseband signal being input.

5. The radar of claim 4, wherein the amplifier includes an operational amplifier and a variable resistor, and
 wherein a frequency gain of the amplifier is controlled by adjusting the variable resistor.

6. The radar of claim 1, wherein the high pass filter cancels a reflected wave or a leakage signal and controls a frequency to have a uniform rate of a gain change.

7. The radar of claim 1, wherein the signal processor determines the second cutoff frequency, based on a maximum reachable distance of the frequency modulated continuous wave signal.

8. A signal processing circuit comprising:
 a high pass filter configured to receive a baseband signal of a second signal based on a first signal, and to attenuate a low frequency signal present in the received baseband signal, based on a first cutoff frequency;
 an amplifier configured to amplify the attenuated baseband signal; and
 a signal controller configured to remove a direct current component of the amplified baseband signal, based on a second cutoff frequency and extract a target frequency signal.

9. The signal processing circuit of claim 8, wherein, when the high pass filter is a first order filter, the first cutoff frequency is set to be the same as the second cutoff frequency, and the first cutoff frequency and the second cutoff frequency are determined as a maximum frequency of the baseband signal being input.

10. The signal processing circuit of claim 9, wherein the amplifier includes a fully differential operational amplifier, a variable resistor, and a capacitor, and
 wherein a frequency gain of the amplifier is controlled by adjusting the variable resistor.

11. The signal processing circuit of claim 8, wherein, when the high pass filter is a second order filter, the first cutoff frequency is determined as a maximum frequency of the baseband signal being input, and the second cutoff frequency is determined as a minimum frequency of the baseband signal being input.

12. The signal processing circuit of claim 11, wherein the amplifier includes an operational amplifier and a variable resistor, and
wherein a frequency gain of the amplifier is controlled by adjusting the variable resistor.

13. The signal processing circuit of claim 8, wherein the high pass filter cancels a reflected wave or a leakage signal and controls a frequency to have a uniform rate of a gain change.

14. The signal processing circuit of claim 8, wherein the second cutoff frequency is determined based on a maximum reachable distance of a frequency modulated continuous wave signal.

15. A signal processing method comprising:
generating a first signal that is a frequency modulated continuous wave (FMCW) signal, and radiating the generated first signal to an outside;
receiving a second signal based on the first signal, and generating a baseband signal of the second signal;
extracting a target frequency signal from the baseband signal; and
outputting the target frequency signal that is controlled as a digital signal, and
wherein the extracting of the target frequency signal comprises:
receiving the baseband signal;
attenuating a low frequency signal present in the received baseband signal, based on a first cutoff frequency;
amplifying the attenuated baseband signal; and
removing a direct current component of the amplified baseband signal, based on a second cutoff frequency.

16. The signal processing method of claim 15, wherein the signal processing method, when the target frequency signal is extracted in a differential mode, further includes:
setting the first cutoff frequency to be the same as the second cutoff frequency; and
determining the first cutoff frequency and the second cutoff frequency as a maximum frequency of the baseband signal being input.

17. The signal processing method of claim 15, wherein the signal processing method, when the target frequency signal is extracted in a single ended mode, further includes:
determining the first cutoff frequency as a maximum frequency of the baseband signal being input; and
determining the second cutoff frequency as a minimum frequency of the baseband signal being input.

18. The signal processing method of claim 15, wherein the attenuating of the low frequency signal present in the received baseband signal, based on the first cutoff frequency includes;
cancelling a reflected wave or a leakage signal; and
controlling a frequency to have a uniform rate of a gain change.

19. The signal processing method of claim 15, wherein the signal processing method further includes:
determining the second cutoff frequency, based on a maximum reachable distance of the frequency modulated continuous wave signal.

* * * * *